United States Patent [19]
Frisch et al.

[11] Patent Number: 5,854,625
[45] Date of Patent: Dec. 29, 1998

[54] FORCE SENSING TOUCHPAD

[75] Inventors: Josef C. Frisch, Belmont; Gregory E. Leyh, Brisbane; John C. Platt, Fremont; Timothy P. Allen, Los Gatos; Richard R. Schediwy, Union City; Federico Faggin, Los Altos Hills, all of Calif.

[73] Assignee: Synaptics, Incorporated, San Jose, Calif.

[21] Appl. No.: 744,283

[22] Filed: Nov. 6, 1996

[51] Int. Cl.⁶ .................................................. G09G 5/00
[52] U.S. Cl. .................... 345/173; 345/174; 178/18.03; 178/18.06
[58] Field of Search ................... 178/18.01, 18.03, 178/18.06; 345/173, 174

[56] References Cited

U.S. PATENT DOCUMENTS

| | | |
|---|---|---|
| Re. 23,030 | 8/1948 | Holt . |
| 2,219,497 | 10/1940 | Stevens et al. . |
| 3,128,458 | 4/1964 | Romero . |
| 3,207,905 | 9/1965 | Bray . |
| 3,244,369 | 4/1966 | Nassimbene . |
| 3,401,470 | 9/1968 | Gaven . |
| 3,437,795 | 4/1969 | Kuljian . |
| 3,482,241 | 12/1969 | Johnson . |
| 3,492,440 | 1/1970 | Cerbone et al. . |
| 3,493,791 | 2/1970 | Adelson et al. . |
| 3,497,617 | 2/1970 | Ellis et al. . |
| 3,497,966 | 3/1970 | Gaven . |
| 3,516,176 | 6/1970 | Cleary et al. . |
| 3,522,664 | 8/1970 | Lambright et al. . |
| 3,530,310 | 9/1970 | Adelson et al. . |
| 3,543,056 | 11/1970 | Klein . |
| 3,549,909 | 12/1970 | Adelson et al. .......................... 307/252 |
| 3,593,115 | 7/1971 | Dym et al. ................................. 323/93 |
| 3,598,903 | 8/1971 | Johnson et al. ............................ 178/18 |
| 3,662,378 | 5/1972 | MacArthur ....................... 340/347 DD |
| 3,675,239 | 7/1972 | Ackerman et al. ..................... 340/365 |

(List continued on next page.)

FOREIGN PATENT DOCUMENTS

| | | |
|---|---|---|
| 0 187 372 | 12/1985 | European Pat. Off. .......... G01B 7/00 |
| 0 490 001 | 6/1992 | European Pat. Off. ........ G06F 3/033 |
| 0 574 213 | 12/1993 | European Pat. Off. ....... G06K 11/16 |
| 0 589 498 | 3/1994 | European Pat. Off. ....... G06K 11/16 |
| 0 609 021 | 8/1994 | European Pat. Off. ....... G06K 11/16 |
| 2 662 528 | 5/1990 | France ........................... G06K 11/16 |
| 60 205625 | 10/1985 | Japan ................................ G06F 3/03 |
| 62 126429 | 6/1987 | Japan .............................. G06F 3/033 |
| 63 073415 | 4/1988 | Japan .............................. G06F 3/033 |
| 2 040614 | 2/1990 | Japan .............................. G02G 1/133 |
| 4 015725 | 1/1992 | Japan .............................. G06F 3/033 |
| 06 139022 | 5/1994 | Japan .............................. G06F 3/033 |
| 2 139 762 | 11/1984 | United Kingdom ............ G06F 3/033 |
| 2 266 038 | 10/1993 | United Kingdom ............ G06F 3/033 |
| 91/03039 | 3/1991 | WIPO .............................. G06G 3/02 |
| 91/05327 | 4/1991 | WIPO .............................. G09G 3/02 |
| 96/18179 | 6/1996 | WIPO ........................... G08C 21/00 |

OTHER PUBLICATIONS

Tiburtius, "Transparente Folientastaturen", Feinwerktechnik & Messtechnik 97, No. 7, Munchen, DE, Jul. 1989, pp. 299–300.

"Double–Click Generation Method for Pen Operations", IBM Technical Disclosure Bulletin, Nov. 1992, vol. 35, No. 6, p. 3.

"Three–Axis Touch–Sensitive Pad", IBM Technical Disclosure Bulletin, Jan. 1987, vol. 29, No. 8, pp. 3451–3453.

Chun, et al., "A High–Performance Silicon Tactile Imager Based on a Capacitive Cell", IEEE Transactions on Electron Devices, Jul. 1985, vol. ED–32, No. 7, pp. 1196–1201.

Primary Examiner—Jeff Hofsass
Assistant Examiner—Ashok Mannava
Attorney, Agent, or Firm—D'Alessandro & Ritchie

[57] ABSTRACT

A force sensing touchpad comprises a substantially rigid touch surface; a substantially rigid frame; a plurality of spring structures formed integrally with the touch surface and mechanically connected to the reference frame; and a circuit for deriving force information from capacitances proportional to the distances between predetermined portions of the touch surface and portions of the frame in response to a force applied to the touch surfaces.

21 Claims, 3 Drawing Sheets

U.S. PATENT DOCUMENTS

| | | | |
|---|---|---|---|
| 3,683,371 | 8/1972 | Holz | 340/365 |
| 3,696,409 | 10/1972 | Braaten | 340/365 |
| 3,732,389 | 5/1973 | Kaelin et al. | 200/167 A |
| 3,737,670 | 6/1973 | Larson | 307/116 |
| 3,757,322 | 9/1973 | Barkan et al. | 340/365 C |
| 3,760,392 | 9/1973 | Stich | 340/200 |
| 3,773,989 | 11/1973 | Hacon | 200/52 R |
| 3,875,331 | 4/1975 | Halsenbalg | 178/19 |
| 3,921,166 | 11/1975 | Volpe | 340/365 C |
| 3,931,610 | 1/1976 | Marin et al. | 340/172.5 |
| 3,932,862 | 1/1976 | Graven | 340/324 M |
| 3,974,332 | 8/1976 | Abe et al. | 178/18 |
| 3,992,579 | 11/1976 | Dym et al. | 178/18 |
| 3,999,012 | 12/1976 | Dym | 178/18 |
| 4,056,699 | 11/1977 | Jordan | 200/5 A |
| 4,058,765 | 11/1977 | Richardson et al. | 324/61 R |
| 4,071,691 | 1/1978 | Pepper, Jr. | 178/19 |
| 4,087,625 | 5/1978 | Dym et al. | 178/19 |
| 4,103,252 | 7/1978 | Bobick | 331/48 |
| 4,129,747 | 12/1978 | Pepper, Jr. | 178/19 |
| 4,148,014 | 4/1979 | Burson | 340/709 |
| 4,177,354 | 12/1979 | Mathews | 178/18 |
| 4,177,421 | 12/1979 | Thornburg | 324/61 R |
| 4,198,539 | 4/1980 | Pepper, Jr. | 178/18 |
| 4,221,975 | 9/1980 | Ledniczki et al. | 307/116 |
| 4,224,615 | 9/1980 | Penz | 340/712 |
| 4,246,452 | 1/1981 | Chandler | 200/5 A |
| 4,257,117 | 3/1981 | Besson | 368/69 |
| 4,264,903 | 4/1981 | Bigelow | 340/365 C |
| 4,281,323 | 7/1981 | Burnett et al. | 340/712 |
| 4,290,052 | 9/1981 | Eichelberger et al. | 340/365 C |
| 4,290,061 | 9/1981 | Serrano | 340/712 |
| 4,291,303 | 9/1981 | Cutler et al. | 340/711 |
| 4,293,734 | 10/1981 | Pepper, Jr. | 178/18 |
| 4,302,011 | 11/1981 | Pepper, Jr. | 273/85 |
| 4,310,839 | 1/1982 | Schwerdt | 340/712 |
| 4,313,113 | 1/1982 | Thornburg | 340/709 |
| 4,334,219 | 6/1982 | Paülus et al. | 340/712 |
| 4,371,746 | 2/1983 | Pepper, Jr. | 178/18 |
| 4,398,181 | 8/1983 | Yamamoto | 340/365 S |
| 4,423,286 | 12/1983 | Bergeron | 178/19 |
| 4,430,917 | 2/1984 | Pepper, Jr. | 84/1.01 |
| 4,442,317 | 4/1984 | Jandrell | 178/18 |
| 4,455,452 | 6/1984 | Schuyler | 178/18 |
| 4,475,235 | 10/1984 | Graham | 382/3 |
| 4,476,463 | 10/1984 | Ng et al. | 340/712 |
| 4,511,760 | 4/1985 | Garwin et al. | 178/18 |
| 4,550,221 | 10/1985 | Mabusth | 178/18 |
| 4,550,310 | 10/1985 | Yamaguchi et al. | 340/365 |
| 4,554,409 | 11/1985 | Mitsui et al. | 178/19 |
| 4,570,149 | 2/1986 | Thornburg et al. | 338/114 |
| 4,582,955 | 4/1986 | Blesser | 178/19 |
| 4,595,913 | 6/1986 | Aubuchon | 340/365 |
| 4,616,107 | 10/1986 | Abe et al. | 178/18 |
| 4,639,720 | 1/1987 | Rympalski et al. | 340/712 |
| 4,672,154 | 6/1987 | Rodgers et al. | 178/19 |
| 4,680,430 | 7/1987 | Yoshikawa et al. | 178/19 |
| 4,686,332 | 8/1987 | Greanias et al. | 178/19 |
| 4,733,222 | 3/1988 | Evans | 340/365 C |
| 4,734,685 | 3/1988 | Watanabe | 340/710 |
| 4,736,191 | 4/1988 | Matzke et al. | 340/365 C |
| 4,758,690 | 7/1988 | Kimura | 178/19 |
| 4,766,423 | 8/1988 | Ono et al. | 340/709 |
| 4,788,385 | 11/1988 | Kimura | 178/19 |
| 4,794,208 | 12/1988 | Watson | 178/19 |
| 4,820,886 | 4/1989 | Watson | 178/19 |
| 4,853,498 | 8/1989 | Meadows et al. | 178/19 |
| 4,914,624 | 4/1990 | Dunthorn | 364/900 |
| 4,918,262 | 4/1990 | Flowers et al. | 178/18 |
| 4,922,061 | 5/1990 | Meadows et al. | 178/19 |
| 4,935,728 | 6/1990 | Kley | 340/709 |
| 4,988,982 | 1/1991 | Rayner et al. | 340/706 |
| 5,016,008 | 5/1991 | Gruaz et al. | 341/33 |
| 5,117,071 | 5/1992 | Greanias et al. | 178/19 |
| 5,120,907 | 6/1992 | Shinbori et al. | 478/18 |
| 5,149,919 | 9/1992 | Greanias et al. | 178/19 |
| 5,153,572 | 10/1992 | Caldwell et al. | 340/712 |
| 5,194,862 | 3/1993 | Edwards | 341/20 |
| 5,231,450 | 7/1993 | Daniels | 355/27 |
| 5,239,140 | 8/1993 | Kuroda et al. | 178/18 |
| 5,270,711 | 12/1993 | Knapp | 341/34 |
| 5,327,161 | 7/1994 | Logan et al. | 345/157 |
| 5,365,254 | 11/1994 | Kawamoto | 345/157 |
| 5,369,227 | 11/1994 | Stone | 178/18 |
| 5,373,118 | 12/1994 | Watson | 178/19 |
| 5,374,787 | 12/1994 | Miller et al. | 178/18 |
| 5,376,948 | 12/1994 | Roberts | 345/173 |

FORCE SENSING TOUCHPAD

GOVERNMENT LICENSE RIGHTS

The U.S. Government has a paid-up license in this invention and the right in limited circumstances to require the patent owner to license others on reasonable terms as provided for by the terms of contract No. N00014-95-C-0047 awarded by the Office of Naval Research.

BACKGROUND OF THE INVENTION

1. Field of the Invention

The present invention relates to touch sensing devices for computer input. More particularly, the present invention relates to a sensor pad that can detect fingers and other passive objects such as non-electronic pens.

2. The Prior Art

There are several prior-art technologies for designing an input pad which can detect the application of fingers and/or other passive objects. While these technologies are presently available, each of them has limitations.

Resistive pads comprise two conductive plates. Such pads operate by having a passive object press the two conductive plates together. The disadvantage of a resistive pad is that it requires a large amount of pressure by a finger in order to make the contact between the two conductive plates. This leads to user fatigue and to rapid wear of the pad.

Capacitive touchpads operate by measuring the capacitance of the passive object to ground, or by measuring the alteration of the transcapacitance between different sensors. An example of a capacitive touchpad is described in U.S. Pat. No. 5,495,077 to Miller. Capacitive pads are inexpensive to manufacture; they do not require complicated mechanical construction or unusual fabrication steps. However, capacitive touchpads can only detect large objects. Small objects, such as the end of a stylus, do not have enough capacitance to ground or transcapacitance to be detected by a capacitive touchpad.

Surface acoustic wave devices operate by emitting sound along the surface of the pad and measuring the interaction of the passive object with the sound. These devices work well, but are much too expensive for general applications.

Multiple technologies have been combined using separate, parallel sensors, as taught in U.S. Pat. No. 5,231,381 to Duwaer. However, Duwaer only teaches the use of stylus technologies that work with active pens. Also, the need to employ two entirely separate technologies can significantly increase the cost of the input device.

Finally, there are devices that use force sensors to measure the location and magnitude of the force exerted by the passive object on the touchpad. A force sensitive touchpad will sense force applied by any sort of passive object, regardless of the electrical conductivity or composition of the object. Such devices were originally described in U.S. Pat. No. 3,657,475 to Peronneau et al. and U.S. Pat. No. 4,121,049 to Roeber. These devices measure the forces transmitted by the touchpad to a fixed frame at multiple points (e.g., at the corners of the pad). Roeber discloses a mathematical formula for deriving the position and magnitude of the force applied by a passive object from the forces measured at the multiple points.

A force-based touch sensor for use with consumer equipment, such as computers, must be both inexpensive and precise. The precision required of such a device is the capability to sense both fingers and pens over a pressure range from about 1 gram to about 300 grams, with a positional precision of 9 bits over this range. This precision level requires a sensor that can measure typical displacements of up to about 15 mils with a noise floor of 14 bits. This noise floor corresponds to a displacement of about 23 nanometers. If the force-based touch sensor is used in a notebook computer, it must also be thin, i.e., less than about 200 mils maximum thickness.

The Peronneau and Roeber patents teach touchpads that have complicated mechanical designs, hence raise the cost of the touchpad and make it thicker than is desirable. Another limitation of the Peronneau and Roeber devices is that they are susceptible to inaccuracies due to transverse forces applied to the pad.

Peronneau and Roeber disclose the use of strain gauges as force measuring devices. Subsequent force sensitive pads (e.g., U.S. Pat. No. 4,621,533 to Gindy; U.S. Pat. No. 4,697,049 to Peemoller; U.S. Pat. No. 5,038,142 to Flowers et al., U.S. Pat. No. 5,327,164 to Fagard, et al.; U.S. Pat. No. 5,241,308 to Young; U.S. Pat. No. 5,488,873 to Delmas, U.S. Pat. No. 4,511,760 to Garwin) also use strain gauges, force sensitive resistors, or piezoelectric sensors. Roeber also discloses alternative strain sensing mechanisms, such as linear variable differential transformers (LVDTs) and variable reluctance pickups. All of these force measuring devices require extra manufacturing steps and/or additional assemblies to be added to the touchpad. Thus, these force measuring devices raise the cost of the touchpad.

U.S. Pat. No. 4,355,202 to DeCosta et al., and U.S. Pat. No. 5,376,948 to Roberts, et al. both teach the use of variable capacitive transducers to measure the displacement of a force sensitive input device due to an applied force. Both of these patents teach devices which are mechanically complex, with complex parts. This complexity both raises the cost of the system and makes the touchpad undesirably thick.

U.S. Pat. No. 4,550,384 to Kimura discloses a force sensitive touchpad constructed out of a single piece of material, with strain gauges disposed on the straining portions of the single piece of material. The mechanical design by Kimura does reduce the cost and thickness of the force sensitive pad. The mechanical design of Kimura also increases the accuracy of the touchpad, because the single piece of material freely allows up-and-down motion but does not easily allow lateral motion.

However, the Kimura touchpad requires the use of strain gauges. As mentioned above, the strain gauges add to the cost of the device, because they require special manufacturing steps or additional components to be mounted on the printed circuit board. It is possible to make strain gauges out of standard copper traces of a PC board, but they are insufficiently precise for this application. Furthermore, the mechanical construction taught by Kimura is non-symmetric. These asymmetries can lead to unwanted non-linear response of the touchpad.

Up until now, the tradeoff between precision and cost has prevented widespread use of force sensing technologies. The several sensor technologies described above that can exhibit the precision required for the real-world force-based touch sensor task each have shortcomings. LVDTs and laser interferometers cost hundreds or thousands of dollars, which make them, as a practical matter, unavailable for widespread use. Strain gauges or lead-zirconium titanate piezoelectric sensors are cheaper than these technologies and are somewhat less accurate, but still require special materials to manufacture, thus raising the price point for the sensor to an unacceptable level.

There are other technologies which can measure force by using relatively inexpensive materials. For example, U.S. Pat. No. 5,296,837 to Yaniger describes a material which uses resistive granules to measure force. Inexpensive piezoelectric materials made of Kynar can also measure force. However, these systems are too inaccurate to use as sensors at the four corners of a force-based touch sensor.

Despite the availability of the existing sensing technologies mentioned herein, the prior art has been unable to provide a low-cost sensor having sufficient accuracy.

It is therefore an object of the present invention to provide a force sensing technology which overcomes some of the deficiencies of the prior art.

It is another object of the present invention to provide a force sensing technology which is inexpensive but has high accuracy.

Yet another object of the present invention is to provide a force sensing technology which has a low height profile.

BRIEF DESCRIPTION OF THE INVENTION

The present invention is directed to overcome the limitations of the prior art. The present invention is inexpensive, because it uses variable capacitive force transducers, instead of strain gauges. Furthermore, the entire assembly consists of only two mechanical pieces, which further reduces the cost and allows the construction of a very thin input device suitable for use in laptop computers.

Because it uses force sensing, the force sensing touchpad of the present invention is broadly applicable to use with both finger and stylus. The force sensing technology of the present invention is accurate, because the pad suspension is integral with the touch surface of the pad and because it is created using a symmetrical mechanical structure. The force sensing touchpad of the present invention is inexpensive to manufacture, accurate, and consumes very little volume, and thus may be used in devices such as portable computers.

The force sensing technology of the present invention measures the location and amount of force applied to a touch surface by mechanically coupling a top planar member carrying the touch surface to a reference frame using a plurality of springs. For lowest cost, these springs are preferably formed integrally with the touch surface, although separate springs can be coupled between the frame and the touch surface. The force at each corner of the touch surface is determined by measuring the displacement of each corner of the touch surface. By measuring these displacements, the moments of the force at each sensor can be determined. From these force moments, the magnitude and position of the applied force can be computed.

The displacement is measured by placing a variable capacitor at each corner, with one plate of the variable capacitor disposed on the top planar member, and the other plate disposed on the reference frame. As force is applied to the touch surface, the touch surface moves closer to the reference surface and the capacitance of each capacitor changes as a monotonic function of the decrease in capacitor plate separation. The springs are preferably four-fold symmetric and the plates of the capacitors may have the same aspect ratio as the touch surface, in order to improve the linearity of the sensor. To keep dirt and dust away from the oscillator plates, a depression may be included in the frame member below and away from the plates in order to collect dust, or the system can be sealed with a thin protective covering layer.

The capacitance of each of the capacitors in the sensor is measured by placing each capacitor in a separate oscillator circuit. The frequency of oscillation of each individual oscillator is a monotonic function of the capacitance of its capacitor, and hence, of the distance between its capacitor plates which are opposingly mounted on the touch surface and the reference frame. The position of the object on the touch surface and the magnitude of its applied force is determined from the oscillator output frequencies.

BRIEF DESCRIPTION OF THE DRAWINGS

FIG. 2b is a cross-sectional view of a variation of the embodiment of the force sensing touchpad of FIG. 2a.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
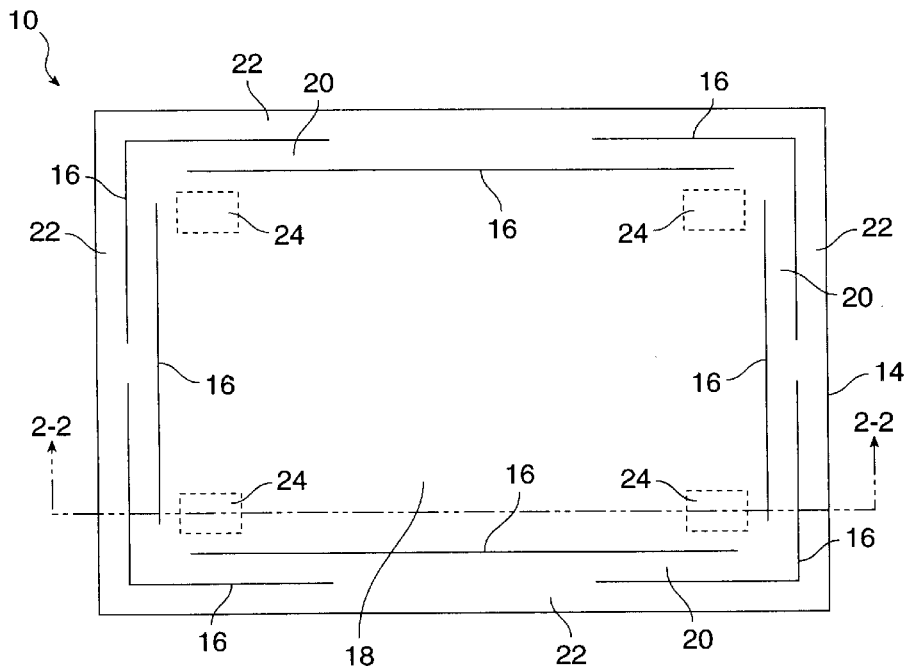
FIG. 1 is a top view of the top surface of a force sensing touchpad according to a presently preferred embodiment of the invention.
Figure 2A:
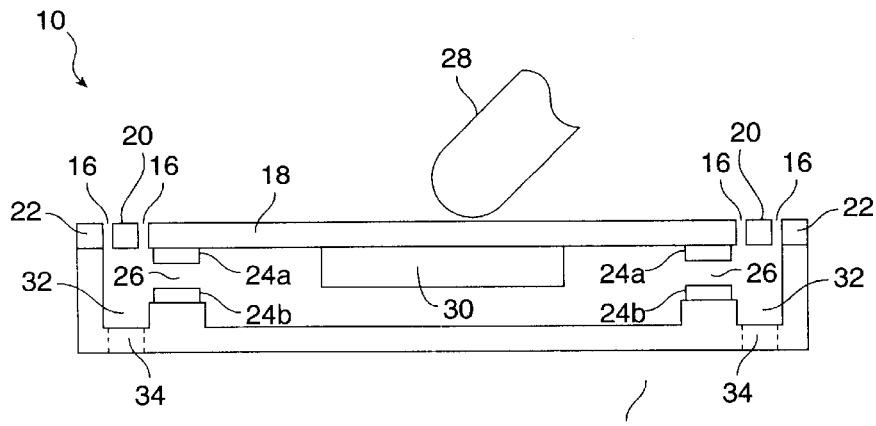
FIG. 2a is a cross-sectional view through the force sensing touchpad of FIG. 1, taken through lines 2—2.

Referring first to FIGS. 1 and 2a, top and cross sectional views, respectively, are shown of a force sensing touchpad 10 according to the present invention. The cross-sectional view of FIG. 2a is taken through lines 2—2 of FIG. 1. Touchpad 10 incudes a frame member 12, which may be formed from a rigid material such as a metal stamping. A top planar member 14, which is formed from, for example, a material such as FR4 printed circuit board material, or stamped metal, etc., is combined with frame member 12 to form a suspension system by providing a plurality of spring members.

According to a presently preferred and illustrative embodiment of the invention, the top planar member 14 is formed in a rectangular shape, although other shapes will readily suggest themselves to those of ordinary skill in the art. Those of ordinary skill in the art will understand that the geometric forms taken by top planar member 14 in the illustrative embodiment of the invention disclosed herein may vary dramatically in concert with the applications to which the concepts of the present invention may be applied.

As presently preferred, the suspension system of the present invention is formed in a single step simply by creating a plurality of slots 16 in top planar member 14. In this embodiment, slots 16 divide the single piece of material comprising top planar member 14 into an inner area touch surface 18, a plurality of spring portions 20, and an outer mounting ring 22. As presently preferred, the slots 16 are positioned to ideally exhibit four-fold symmetry, so as to reduce any non-idealities resulting from the mechanical design. The outer mounting ring 22 defined by this single step may easily be affixed to the periphery of reference frame member 12 using known methods to form the suspension system of the present invention.

According to the preferred embodiment illustrated herein, the horizontal slots 16 are the same length as the vertical slots 16 on the left and right of the top planar member 14, so as to ensure that all springs 20 are the same length and thus ideally matched. The material from which top planar member 14 is formed should be substantially rigid, so as to linearly transmit an applied force from touch surface 18 to the spring portions 20 without substantial deformation of touch surface 18 which would degrade the precision of the measurement made herein, especially for measurement of small forces.

For purposes of the illustrative embodiment disclosed herein, the force may be considered to have been applied by an object such as a finger or passive stylus, but those of ordinary skill in the art will observe that the invention may be scaled to sense forces outside of the range of forces which such objects are capable of exerting. The force sensing touchpad of the present invention operates by sensing the physical separation between opposing points on the top planar member 14 and frame member 12 as the result of applied force.

The cross-sectional view of FIG. 2a shows the contact alignment between outer mounting ring 22 of top planar member 14 and frame member 12 and illustrates an exemplary application of the principle of the present invention. According to a presently preferred embodiment of the invention, a plurality of capacitors 24 are disposed at the periphery of the touch surface 18. The top plate of each capacitor, denoted by reference numeral 24a, is disposed on the bottom of the touch surface 18, while the other plate, denoted by reference numeral 24b, is disposed on or integral with the frame member 12.

Plates 24a and 24b of each capacitor are separated by an air gap dielectric 26. As presently preferred, the distance between opposing plates 24a and 24b is between about 5 mils and about 20 mils with no force exerted on touch surface 18. According to a design tradeoff, a smaller capacitor plate separation allows the use of stiffer springs 20, and makes the touch sensor 10 less susceptible to external vibrations. However, manufacturing tolerances are more critical in designs utilizing smaller capacitor plate separations. A no-force capacitor separation range between about 5 mils and about 20 mils has been found to be acceptable from both sides of this tradeoff. Those of ordinary skill in the art will appreciate that other embodiments of the invention are contemplated by merely varying spring stiffness and the dimensions of air gap dielectric 26.

According to a presently preferred embodiment of the invention, the frame member 12 is formed from conductive material such as stamped metal and is electrically grounded. In such an embodiment, capacitor plate 24b is integral with frame member 12. When a finger or stylus 28 presses down on touch surface 18, the capacitor plates 24a and 24b of all capacitors 24 are brought closer together, thus increasing the capacitance of the capacitors 24. If the finger or stylus 28 is placed directly in the center of touch surface 18, the distances between the opposing plates of each capacitor 24 will decrease by the same amount, thus producing theoretically identical capacitance changes for all capacitors 24. If, however, the finger or stylus 28 is placed at a location other than the center of the touch surface 18, the distances between the opposing plates of individual capacitors 24 will each decrease by different amounts depending on the location of the finger or stylus 28 on touch surface 18, and the capacitance changes will be different.

If top planar member 14 is made of printed circuit board material, capacitor plates 24a can be formed from copper traces on the lower surface thereof. In addition, other circuit elements 30, such as the sensing circuitry for the present invention to be disclosed herein with reference to FIG. 5, can be placed on the bottom face of the top planar member 14. This arrangement permits fabrication of a compact, integrated force sensing touchpad. Those of ordinary skill in the art will observe that, while reference numeral 30 illustratively designates a single structure on the bottom of top planar member 14, multiple independent structures, such as one or more integrated circuits and/or discrete components may be employed to comprise circuitry 30.

The immediate vicinity of capacitor plates 24 is grounded in order to shield the capacitor plates 24 from external noise. According to the presently preferred embodiment of the invention, the entire frame member 12 is a grounded metal object. As will be apparent to those of ordinary skill in the art, the frame member 12 preferably extends inward beyond the capacitor plates 24b as shown in FIG. 2a in order to provide a ground plane to shield the capacitor plates 24b from noise emanating from below the center of the touch surface 18. In addition, the top surface of top planar member 14 is also grounded, in order to shield capacitor plates 24 from noise emanating from above the touch surface 18. The top surface of the top planar member 14 is then the ground plane for the entire sensor, supplying ground to circuitry 30 and to the frame member 12. The top surface of the touch surface 18 can be covered with a thin layer of mylar, to make it feel good to the touch.

As an alternative embodiment, the circuitry 30 may be placed on the top surface of frame member 12. Frame 12 would then be made from printed circuit board material and would not be grounded. The bottom surface of the top planar member 14 would be grounded instead. This alternative embodiment is less preferred, because the connection from circuitry 30 to capacitor plate 24b would result in a higher manufacturing cost.

Figure 2B:
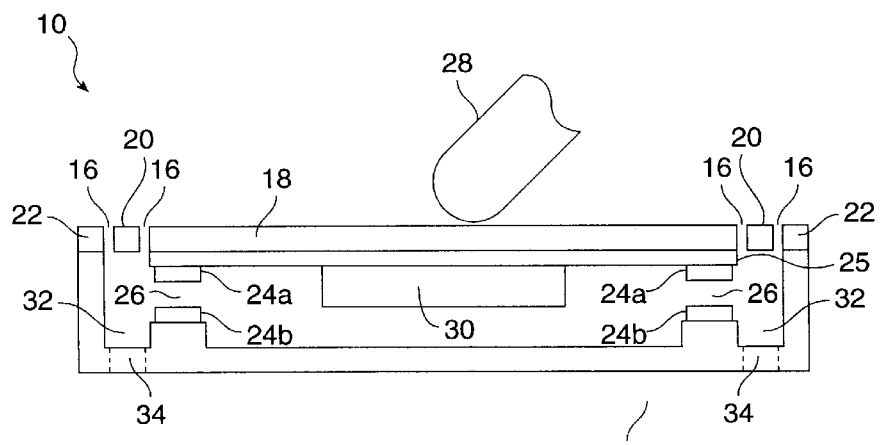

Alternatively, as shown in FIG. 2b, a piece of circuit board material 25 can be adhered to the bottom of touch surface 18, which allows the designer to use materials such as spring steel or phosphor bronze for the top planar member 14. Those of ordinary skill in the art will appreciate that such materials have better spring properties (such as creep) than standard printed circuit board epoxy/glass composites, although they make the entire force sensing touchpad more complex to assemble.

During normal use of the force sensing touchpad 10 of the present invention, dirt, dust, liquids and other debris may fall through the slots 16 and possibly interfere with the operation of the force sensing touchpad by lodging in air gap dielectrics 26. To mitigate this problem, frame member 12 may be provided with depressed regions 32 comprising a dirt-collection areas located away from and below the capacitor plates 24b. The depressed regions 32 prevent dirt, dust, liquids and other debris from migrating into the air gap dielectrics 26 between the capacitor plates 24a and 24b. The depressed regions 32 may be disposed underneath the slots 16, preferably along the entire perimeter of the touch surface 18. For the parts of the perimeter that are located away from the capacitor plates 24a and 24b, a channel 34 (shown in dashed lines in FIGS. 2a and 2b) may be cut below the depressed regions 32 in order to prevent them from overflowing.

Figure 3A:
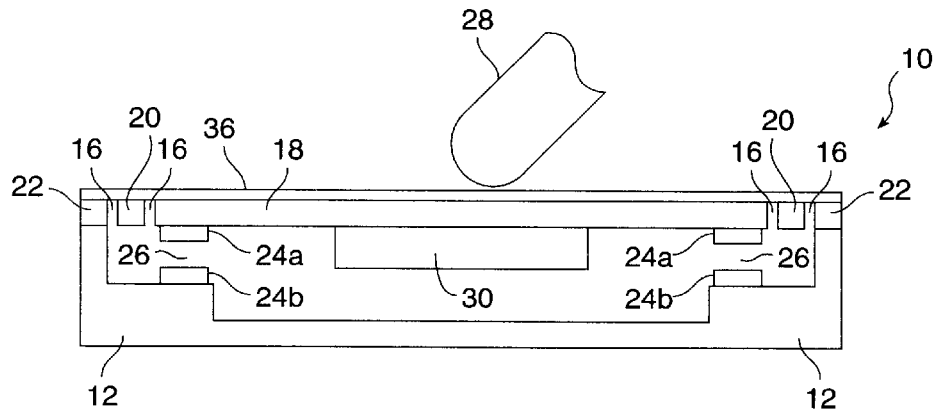
FIG. 3a is a cross-sectional view of an alternative embodiment of a force sensing touchpad according to the present invention including a protective layer disposed over the touch surface.

A cross-sectional view of an alternate embodiment of the present invention is show in FIG. 3a. The embodiment of FIG. 3a is similar to that shown in FIGS. 2a and 2b except that the top of the force sensing touchpad is completely sealed by a thin protective layer 36. This protective layer 36 may be formed, for example, from a sheet of neoprene having a thickness in the neighborhood of about 2 mils or from similar materials. The embodiment of FIG. 3a will be immune to dirt, but the protective layer may affect the accuracy of the touch sensor, due to slight torques exerted by layer 36 on touch surface 18. Those of ordinary skill in the art will appreciate that the embodiment of FIG. 3a is environmentally sealed and protected from intrusion of dirt and dust and thus does not require depressed regions 32 and their associated channels 34.

Figure 3B:
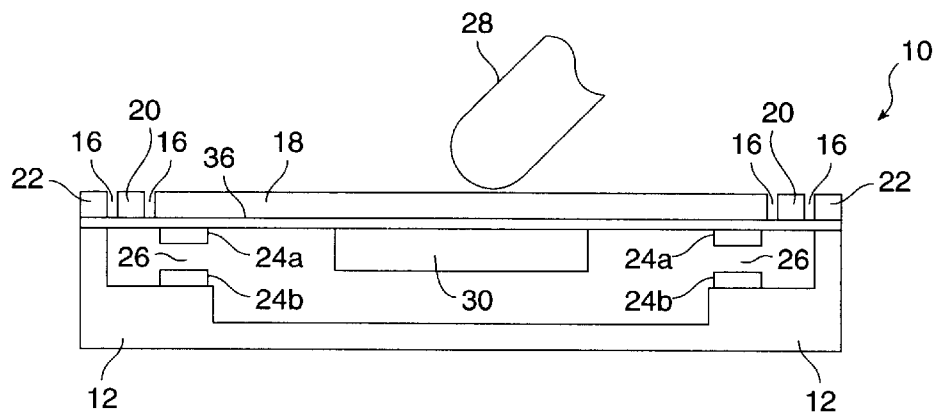
FIG. 3b is a cross-sectional view of an alternative embodiment of a force sensing touchpad according to the present invention and differs from the embodiment of FIG. 3a in that the protective layer is disposed under the touch surface.

Referring now to FIG. 3b, an alternate embodiment like that of FIG. 3a is depicted in cross sectional view. The embodiment of FIG. 3b differs from that depicted in FIG. 3a in that the neoprene layer 36 is disposed under the touch surface 18.

Figure 4:
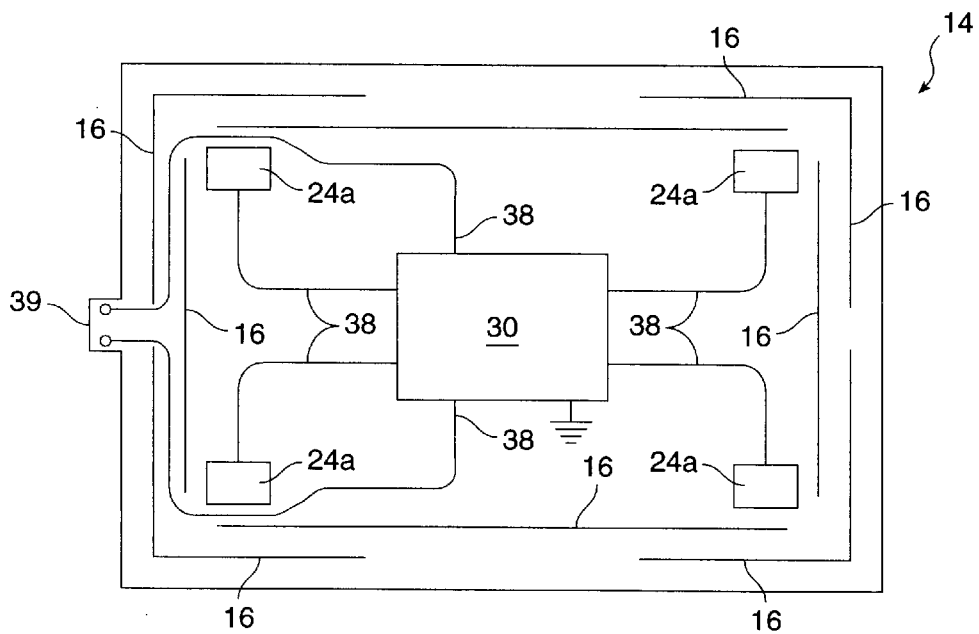
FIG. 4 is a bottom view of the input surface of the force sensing touchpad of the present invention.

Referring now to FIG. 4, a bottom view of the top planar member 14 is shown. According to a presently preferred embodiment of the invention, the capacitor plates 24a mounted on or integral with top planar member 14 have the same aspect ratio as the touch surface 18, in order to cancel non-linear response caused by the tilting of the capacitors across the non-zero size of the capacitors. Thus, as shown in FIG. 4, the faces of capacitor plates 24a have lengths and widths selected to produce the same aspect ratio of the length and width of touch surface 18.

In an actual embodiment of a force sensing touchpad fabricated according to the present invention, capacitor plates 24a are formed from copper pads on the printed circuit board material, while capacitor plates 24b are integral to frame 12, which is a grounded, metallic object. In the presently preferred embodiment, capacitor plates 24a are rectangles formed to dimensions of 690 mils by 460 mils (to match the aspect ratio of touch surface 18). With a nominal air gap dielectric thickness of 11 mils, the capacitors 24 each have a no-force capacitance of about 20 pF.

As may also be seen from an examination of FIG. 4, circuitry 30 mounted on top planar member 14 communicates with the capacitor pads 24a and with other circuitry located other than on top planar member 14 via conductors 38. Conductors 38 are traces formed on the material used to form top planar member 14 provide a convenient way to couple electronic signals from circuitry mounted on the bottom of touch surface 18 without affecting the force measurement. As is obvious to those skilled in the art, the ends of conductors 38 which are used for off-sensor connection must not be covered by reference frame member 12, in order to allow connections to an external system. Conductors 38 which are used for off-sensor connection can terminate on a tab 39 of material that extends beyond the main rectangular core of top planar surface 14. While two representative conductors 38 are shown for off-sensor connections in the drawing figure, persons skilled in the art will appreciate that the number of conductors employed in actual systems embodying the present invention are contemplated and will depend on the particular designs. The ground connection to the outside world can also be placed amongst the connectors on tab 39. This ground connection will connect to the top surface of the top planar member 14, to provide ground for the entire sensor.

In an embodiment of the present invention wherein top planar member 14 is formed from printed circuit material, conductors 38 may advantageously be formed as conductive traces on the printed circuit material, as are capacitor plates 24a. It will be understood that other interconnection methods such as providing wires to carry signals to and from circuitry 30 are possible. Such other interconnect methods can introduce a parasitic mechanical coupling between top planar member 14 and frame member 12 and thus potentially degrade the accuracy of the system, especially one tailored to detection of small forces. It is obvious to those skilled in the art that any wires that connect to circuitry 30 that are not traces on top planar member 14 should be made a thin as possible to minimize the degradation of sensor accuracy. Providing trace conductors 38 used for off-sensor connections which communicate with the fixed outer mounting ring 22 of top planar member 14 eliminates any inaccuracy caused by such signal wires and is consistent with the goal of certain embodiments of the present invention to achieve sensitivity to light forces (e.g. about 1 gram). The alternative embodiment shown in FIG. 2b does not permit the use of off-sensor connection trace conductors 38.

Many different methods for measuring capacitance are well-known in the art. For example, a circuit can be employed to measure the AC coupling between the plates, or alter the charge on the capacitor and measuring the resulting voltage change. Other capacitance measuring circuits can suggest themselves to those skilled in the art.

Figure 5:
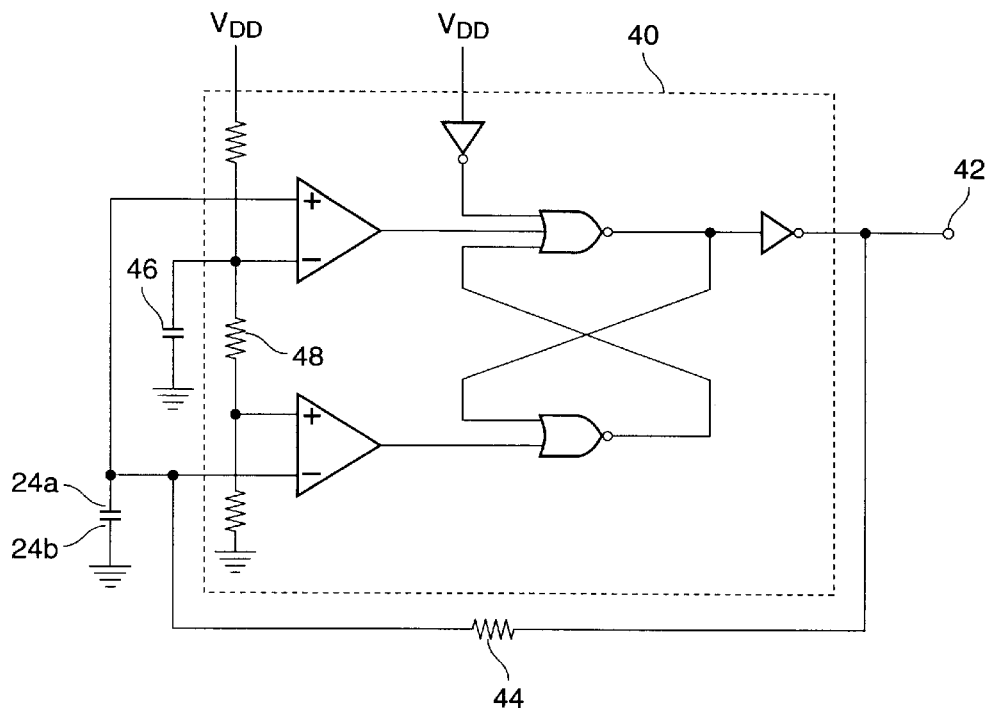
FIG. 5 is a schematic diagram of an oscillator circuit which may be used to measure the variable capacitance of the force sensing touchpad according the invention.

Referring now to FIG. 5, according to the presently preferred embodiment of the invention 5, an oscillator 40 is connected to every pair of capacitor plates 24a and 24b. Plate 24b is held at ground. Each oscillator 40 shares the common ground with capacitor plates 24b and senses the voltage on plate 24a to produce a digital square wave on output node 42 which alternatively charges and discharges plate 24a through resistor 44. The oscillator circuit 40 may be configured from the well-known "555" oscillator integrated circuit, the essential features of which are shown for illustration purposes. Some of the internal circuitry of a 555 oscillator is shown in FIG. 5 for reference purposes.

The frequency of the square wave on output node 42 is inversely proportional to the capacitance between plates 24a and 24b. According to a presently preferred embodiment of the invention, the value of resistor 44 is chosen so that the frequency of oscillation of the oscillator of FIG. 5 is approximately 100 kHz, although the circuit can function over a very wide range of frequencies. Setting the frequency entails a tradeoff between precision and power consumption. As the frequency is lowered, the amount of power consumption goes down linearly with frequency. However, phase noise in the oscillator will gradually lower the precision of the touchpad as the frequency gets lower. It has been found that 100 kHz is a good tradeoff between precision and power consumption.

The capacitor 46 is a filtering capacitor which is provided to reject power supply noise below a certain frequency. The value of capacitor 46 multiplied by the value of resistor 48 (internal to the 555 integrated circuit) should be chosen to be smaller than typical sampling times used in the system, such as 12.5 milliseconds. In the presently preferred embodiment, the value of capacitor 46 multiplied by the value of resistor 48 is chosen to be 10 milliseconds.

As will be obvious to those skilled in the art, other oscillator circuits can be used instead of the oscillator 40, such as a Schmitt trigger. The 555 integrated circuit oscillator has been chosen to minimize power supply sensitivity. Furthermore, it will be apparent to those skilled in the art that a mixed-signal VLSI ASIC integrated circuit which uses an oscillator circuit employing current sources instead of resistors can be used in the present invention.

Figure 6:
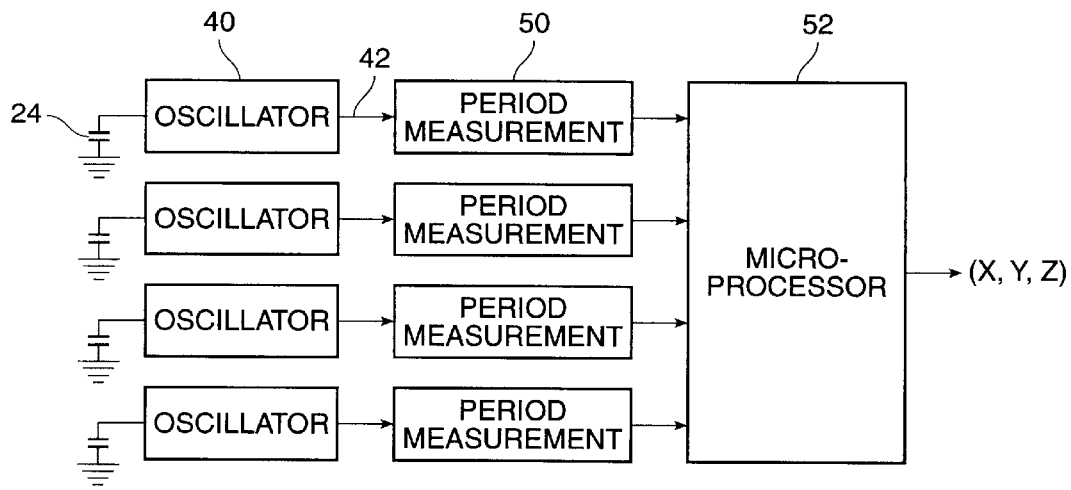
FIG. 6 is a block diagram showing the overall architecture of the data processing of the touch sensor of the present invention.

Referring now to FIG. 6, a block diagram shows the overall architecture of the data processing of the touch sensor of the present invention. Each capacitor 24 is connected to an oscillator 40, which sends a square wave on output node 42 to the period determination circuitry 50. The frequency and/or period of the square wave on output node 42 can be very accurately measured using digital circuits that are well-known in the art. Many such circuits are known and will yield equivalent accuracies. For illustrative examples of such a circuit, see U.S. Pat. No. 4,027,146 to Gilmore, U.S. Pat. No. 4,052,620 to Brunnett, or U.S. Pat. No. 4,350,950 to Waldmann, et al. Once the period has been determined for the oscillator driven by the capacitor 24 in every corner, a microprocessor 52 may be used to compute the X and Y location of the applied force and the amount of applied force (Z) on the touchpad. The computation that occurs in the microprocessor is now disclosed.

The period of oscillation of the oscillator 40 is proportional to the capacitance of the capacitor 24 according to the equation:

$$T = KC$$

where T is the period, C is the capacitance, and K is a constant depending on the circuit used. The capacitance C is related to the distance between capacitor plates 24a and 24b by the equation:

$$C = C_0 + \frac{C_1}{d}$$

where C0 is a background capacitance, C1 is a proportional capacitance, and d is the distance between the plates. Combining these equations results in:

$$d = \frac{b}{(T - a_0)}$$

where a0 and b are constants.

The springs 20 fabricated from FR4 are very close to linear, which means that the force F exerted on the corner obeys the equation:

$$F = s\,(d_0 - d)$$

where s is the strength of the spring and d0 is the distance between capacitor plates when no force is applied to the touch surface 18.

After algebraic manipulation, the force on a corner can be related to the period through the equation:

$$F = a_1 \left( \frac{T - T_0}{T - a_0} \right)$$

where a0 is defined above, a1 is a constant, and T0 is the period of the oscillator when no force is applied to the touch surface 18. Therefore, to determine the force-based on the oscillator period, three constants (T0, a0, and a1) must be determined.

The constant T0 is determined by measuring the period of the oscillator when there is no force applied to the touch surface 18. In order to track the drift of the oscillator, a microprocessor 52 will periodically detect when there is no force applied to the touch surface and memorize the period T0 when no force is applied. Detection of "no force" intervals is well-known in the art, and is described in U.S. Pat. No. 5,543,591 to Allen et al.

The constants a0 and a1 are measured at time of manufacture, when a series of known forces are applied to the exact center of the pad and the periods of the oscillators are measured. The constants a0 and a1 can be computed from a least squares fit, as is well-known in the art, by minimizing the function $$\sum_{i=0}^{i} [F_i(T_i - a_0) - a_i(T_i - T_0)]^2$$

with respect to a0 and a1, where Fi is the ith known force applied to the corner (which is typically the total force divided by 4), and Ti is the ith measured period of the same corner.

Once the force at each corner has been computed, microprocessor 52 can compute the magnitude and location of an applied force via the method disclosed in U.S. Pat. No. 4,121,049 to Roeber. The total force, Z, is merely the sum of the four corner forces, F1 through F4:

$$Z = F_1 + F_2 + F_3 + F_4$$

The X location of the applied force is the two right forces (F1 and F2), minus the two left forces, (F3 and F4), normalized by Z:

$$X = \frac{(F_1 + F_2 - F_3 - F_4)}{Z}$$

The Y location of the applied force is the two top forces (F1 and F3), minus the two bottom forces, (F2 and F4), normalized by Z:

$$Y = \frac{(F_1 + F_3 - F_2 - F_4)}{Z}$$

In summary, a method has been disclosed for deriving the force applied to each corner of the touchpad from the period of the corresponding oscillator 40. The method depends on the fact that the period of the oscillator 40 is a monotonic function of the distance between the capacitor plates 24a and 24b, and the force applied to each corner is a monotonic function of this same distance. Therefore, the distance does not need to be explicitly calculated: only quantities that are monotonic in the distance are manipulated.

Figure 7:
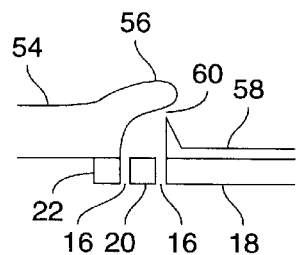
FIG. 7 is a cross sectional view of a portion of an outer edge of the force sensing touchpad of the present invention illustrating a presently preferred method for mounting the force-sensitive touchpad to an external frame.

Referring now to FIG. 7, a cross sectional view of a portion of an outer edge of the force sensing touchpad 10 of the present invention illustrates a presently preferred method for mounting the force-sensitive touchpad 10 to an external frame 54, such as the external frame of a portable computer or keyboard. Only mounting ring 22 of top planar member 14 should be firmly attached to external frame 54. Springs 20 and touch surface 18 should be free to move in response to applied forces.

In order to improve dirt immunity, and improve the aesthetics of device, frame 54 includes a bezel 56 which hides springs 20. Because dirt can be swept into slots 16 by finger motion, an escutcheon 58 is mounted on top of touch surface 18. According to a presently preferred embodiment of the invention, the escutcheon 58 is about 120 mils high at its highest point, and forms a gap 60 with the bezel 56 which is about 15 mils high when no force is applied to touch surface 18. The frame 54 and the escutcheon 56 may be formed out of any convenient, inexpensive material. The escutcheon 58 can also be covered with a layer that feels good to the touch.

The force-based touch sensor of the present invention is especially suitable for use in a notebook computer, since its height is less than about 200 mils maximum. The force-based touch sensor of the present invention has the capability to sense both fingers and pens over a pressure range from about 1 gram to about 300 grams, with a positional precision of 9 bits over this range. The force-based touch sensor of the present invention can measure typical displacements of up to about 15 mils with a noise floor of 14 bits.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A force sensing touchpad comprising:
   a substantially rigid touch surface, force to be sensed being applied thereto;
   a substantially rigid frame member;
   a plurality of spring means disposed between said touch surface and said frame member, said spring means mechanically connected to said touch surface and said frame member; and
   a plurality of variable capacitors associated with said touchpad, each variable capacitor having a capacitance which is a monotonic function of the distance between selected portions of said touch surface and said frame member, each said variable capacitor having sense outputs.

2. The force sensing touchpad of claim 1 wherein said plurality of spring means substantially inhibit lateral motion between said touch surface and said frame member.

3. The force sensing touchpad of claim 1, wherein said spring means are four-fold symmetric in shape.

4. The force sensing touchpad of claim 1, further including means coupled to said sense outputs of said plurality of variable capacitors to determine the magnitude and location of a force applied to said touch surface.

5. The force sensing touchpad of claim 1, wherein said touch surface has a rectangular shape.

6. The force sensing touchpad of claim 1, wherein said variable capacitors each comprise a first plate disposed on said touch surface and a second plate disposed on said frame member.

7. The force sensing touchpad of claim 5, wherein each of said variable capacitors comprises a first plate and a second plate separated by an air gap dielectric, said first plate of each variable capacitor disposed on a lower face of said touch surface and having a rectangular shape with the same aspect ratio as said touch surface, said second plate of each variable capacitor disposed on said frame member.

8. The force sensing touchpad of claim 7, wherein said frame member comprises a conductive material and wherein said second plate of each variable capacitor comprises a portion of said frame member.

9. The force sensing touchpad of claim 1, further including:
   individual oscillator circuits, each coupled to the sense outputs of a different one of said variable capacitors, said individual oscillator circuits having output frequencies depend on the capacitance of said variable capacitors; and
   means for measuring the output frequencies of said oscillator circuits and for determining therefrom the location on the touchpad of an object exerting a force thereon and the magnitude of said force.

10. The force sensing touchpad of claim 1, wherein said frame member includes depressed debris collecting regions.

11. The force sensing touchpad of claim 1 further including a thin protective covering layer over said touch surface and said spring means.

12. The force sensing touchpad of claim 1 further including a thin protective covering layer under said touch surface and said spring means.

13. The force sensing touchpad of claim 1, wherein said touch surface comprises a layer of material optimized for mechanical spring properties, and a layer of material optimized for circuit board properties.

14. The force sensing touchpad of claim 1 having a maximum height of less than about 200 mils.

15. The force sensing touchpad of claim 1 having a low end force sensitivity of about 1 gram.

16. The force sensing touchpad of claim 1, wherein said plurality of spring means are formed integrally with said touch surface.

17. The force sensing touchpad of claim 16, wherein said touch surface and said plurality of spring means are integrated in a planar member, said planer member including slots defining said plurality of spring means from said touch surface.

18. The force sensing touchpad of claim 1, wherein each of said variable capacitors is sensitive along a direction substantially perpendicular to said touch surface.

19. A force sensing touchpad comprising:
   a substantially rigid touch surface having a rectangular shape;
   a substantially rigid frame member;
   a plurality of spring means disposed between said touch surface and said frame member, said spring means mechanically connected to said touch surface and said frame member; and
   a plurality of variable capacitors associated with said touchpad, each variable capacitor having a capacitance which is a monotonic function of the distance between selected portions of said touch surface and said frame member, each said variable capacitor having sense outputs,
   wherein said plurality of variable capacitors comprises four variable capacitors, each of said variable capacitors located symmetrically at corners of a rectangle centered on said touch surface.

20. A method for sensing the magnitude and point of application of a force applied to a touchpad comprising the steps of:
   providing a substantially rigid touch surface, force to be sensed being applied thereto;
   providing a substantially rigid frame member;
   providing a plurality of spring means disposed between said touch surface and said frame member, said spring means mechanically connected to said touch surface and said frame member;
   providing a plurality of variable capacitors associated with said touchpad, each variable capacitor having a capacitance which is a monotonic function of the distance between selected portions of said touch surface and said frame member, each said variable capacitor having sense outputs;

providing force determining means coupled to said sense outputs of said plurality of variable capacitors to determine the magnitude and location of a force applied to said touch surface.

21. The method of claim 20, wherein the step of providing force determining means includes the steps of:

providing individual oscillator circuits, each coupled to the sense outputs of a different one of said variable capacitors, said individual oscillator circuits having output frequencies depend on the capacitance of said variable capacitors; and providing means for measuring the output frequencies of said oscillator circuits and for determining therefrom the location on the touchpad of an object exerting a force thereon and the magnitude of said force.

* * * * *

UNITED STATES PATENT AND TRADEMARK OFFICE
CERTIFICATE OF CORRECTION

PATENT NO. : 5,854,625

DATED : December 29, 1998

INVENTOR(S) : Josef Frisch, Gregory Leyh, John C. Platt, Timothy P. Allen, Richard Schediwy, and Federico Faggin It is certified that error appears in the above-identified patent and that said Letters Patent is hereby corrected as shown below:

On column 4, line 52, please replace "incudes" with --includes--.

On column 7, line 12, please replace "show" with --shown--.

On column 9, line 44, please replace "C0" with --$C_0$--.

On column 9, line 44, please replace "C1" with --$C_1$--.

On column 9, line 51, please replace "a0" with --$a_0$--.

On column 9, line 56, please replace "d0" with --$d_0$--.

On column 9, line 66, please replace "a0" with --$a_0$--.

On column 9, line 66, please replace "a1" with --$a_1$--.

On column 9, line 66, please replace "T0" with --$T_0$--.

On column 10, line 2, please replace "T0" with --$T_0$--.

On column 10, line 2, please replace "a0" with --$a_0$--.

On column 10, line 2, please replace "a1" with --$a_1$--.

On column 10, line 4, please replace "T0" with --$T_0$--.

On column 10, line 9, please replace "T0" with --$T_0$--.

On column 10, line 12, please replace "a0" with --$a_0$--.

On column 10, line 12, please replace "a1" with --$a_1$--.

UNITED STATES PATENT AND TRADEMARK OFFICE
CERTIFICATE OF CORRECTION

PATENT NO. : 5,854,625
DATED : December 29, 1998
INVENTOR(S) : Josef Frisch, Gregory Leyh, John C. Platt, Timothy P. Allen, Richard Schediwy, and Federico Faggin It is certified that error appears in the above-identified patent and that said Letters Patent is hereby corrected as shown below:

On column 10, line 15, please replace "a0" with --$a_0$--.
On column 10, line 15, please replace "a1" with --$a_1$--.
On column 10, line 22, please replace "a0" with --$a_0$--.
On column 10, line 22, please replace "a1" with --$a_1$--.
On column 10, line 24, please replace "Ti" with --$T_i$--.
On column 10, line 30, please replace "F1" with --$F_1$--.
On column 10, line 30, please replace "F4" with --$F_4$--.
On column 10, line 35, please replace "F1" with --$F_1$--.
On column 10, line 35, please replace "F2" with --$F_2$--.
On column 10, line 35, please replace "F3" with --$F_3$--.
On column 10, line 35, please replace "F4" with --$F_4$--.
On column 10, line 42, please replace "F1" with --$F_1$--.
On column 10, line 42, please replace "F3" with --$F_3$--.
On column 10, line 42, please replace "F2" with --$F_2$--.
On column 10, line 42, please replace "F4" with --$F_4$--.

UNITED STATES PATENT AND TRADEMARK OFFICE
CERTIFICATE OF CORRECTION

PATENT NO. : 5,854,625
DATED : December 29, 1998
INVENTOR(S) : Josef Frisch, Gregory Leyh, John C. Platt, Timothy P. Allen, Richard Schediwy, and Federico Faggin It is certified that error appears in the above-identified patent and that said Letters Patent is hereby corrected as shown below:

Claims 6-21 should read as follows:

--6. A force sensing touchpad comprising:

a substantially rigid touch surface having a rectangular shape;

a substantially rigid frame member;

a plurality of spring means disposed between said touch surface and said frame member, said spring means mechanically connected to said touch surface and said frame member; and a plurality of variable capacitors associated with said touchpad, each variable capacitor having a capacitance which is a monotonic function of the distance between selected portions of said touch surface and said frame member, each said variable capacitor having sense outputs, wherein said plurality of variable capacitors comprises four variable capacitors, each of said variable capacitors located symmetrically at corners of a rectangle centered on said touch surface.

UNITED STATES PATENT AND TRADEMARK OFFICE
CERTIFICATE OF CORRECTION

PATENT NO. : 5,854,625
DATED : December 29, 1998   Page 4 of 9
INVENTOR(S) : Josef Frisch, Gregory Leyh, John C. Platt, Timothy P. Allen, Richard Schediwy, and Federico Faggin It is certified that error appears in the above-identified patent and that said Letters Patent is hereby corrected as shown below:

7. The force sensing touchpad of claim 1, wherein said variable capacitors each comprise a first plate disposed on said touch surface and a second plate disposed on said frame member 8. The force sensing touchpad of claim 5, wherein each of said variable capacitors comprises a first plate and a second plate separated by an air gap dielectric, said first plate of each variable capacitor disposed on a lower face of said touch surface and having a rectangular shape with the same aspect ratio as said touch surface, said second plate of each variable capacitor disposed on said frame member.

9. The force sensing touchpad of claim 7, wherein said frame member comprises a conductive material and wherein said second plate of each variable capacitor comprises a portion of said frame member.

UNITED STATES PATENT AND TRADEMARK OFFICE
CERTIFICATE OF CORRECTION

PATENT NO. : 5,854,625
DATED : December 29, 1998
INVENTOR(S) : Josef Frisch, Gregory Leyh, John C. Platt, Timothy P. Allen, Richard Schediwy, and Federico Faggin It is certified that error appears in the above-identified patent and that said Letters Patent is hereby corrected as shown below:

10. The force sensing touchpad of claim 1, further including:

individual oscillator circuits, each coupled to the sense outputs of a different one of said variable capacitors, said individual oscillator circuits having output frequencies depend on the capacitance of said variable capacitors; and means for measuring the output frequencies of said oscillator circuits and for determining therefrom the location on the touchpad of an object exerting a force thereon and the magnitude of said force.

11. The force sensing touchpad of claim 1, wherein said frame member includes depressed debris collecting regions.

12. The force sensing touchpad of claim 1 further including a thin protective covering layer over said touch surface and said spring means.

13. The force sensing touchpad of claim 1 further including a thin protective covering layer under said touch surface and said spring means.

UNITED STATES PATENT AND TRADEMARK OFFICE
CERTIFICATE OF CORRECTION

PATENT NO. : 5,854,625
DATED : December 29, 1998
INVENTOR(S) : Josef Frisch, Gregory Leyh, John C. Platt, Timothy P. Allen, Richard Schediwy, and Federico Faggin It is certified that error appears in the above-identified patent and that said Letters Patent is hereby corrected as shown below:

14. The force sensing touchpad of claim 1, wherein said touch surface comprises a layer of material optimized for mechanical spring properties, and a layer of material optimized for circuit board properties.

15. The force sensing touchpad of claim 1 having a maximum height of less than about 200 mils.

16. The force sensing touchpad of claim 1 having a low end force sensitivity of about 1 gram.

17. A method for sensing the magnitude and point of application of a force applied to a touchpad comprising the steps of:
   providing a substantially rigid touch surface, force to be sensed being applied thereto;
   providing a substantially rigid frame member;

UNITED STATES PATENT AND TRADEMARK OFFICE
CERTIFICATE OF CORRECTION

PATENT NO. : 5,854,625
DATED : December 29, 1998
INVENTOR(S) : Josef Frisch, Gregory Leyh, John C. Platt, Timothy P. Allen, Richard Schediwy, and Federico Faggin It is certified that error appears in the above-identified patent and that said Letters Patent is hereby corrected as shown below:

providing a plurality of spring means disposed between said touch surface and said frame member, said spring means mechanically connected to said touch surface and said frame member;

providing a plurality of variable capacitors associated with said touchpad, each variable capacitor having a capacitance which is a monotonic function of the distance between selected portions of said touch surface and said frame member, each said variable capacitor having sense outputs;

providing force determining means coupled to said sense outputs of said plurality of variable capacitors to determine the magnitude and location of a force applied to said touch surface.

18. The method of claim 17, wherein the step of providing force determining means includes the steps of:

providing individual oscillator circuits, each coupled to the sense outputs of a different one of said variable capacitors, said individual oscillator circuits having output frequencies depend on the capacitance of said variable capacitors; and

UNITED STATES PATENT AND TRADEMARK OFFICE
CERTIFICATE OF CORRECTION

PATENT NO. : 5,854,625
DATED : December 29, 1998
INVENTOR(S) : Josef Frisch, Gregory Leyh, John C. Platt, Timothy P. Allen, Richard Schediwy, and Federico Faggin It is certified that error appears in the above-identified patent and that said Letters Patent is hereby corrected as shown below:

providing means for measuring the output frequencies of said oscillator circuits and for determining therefrom the location on the touchpad of an object exerting a force thereon and the magnitude of said force.

19. The force sensing touchpad of claim 1, wherein said plurality of spring means are formed integrally with said touch surface.

20. The force sensing touchpad of claim 19, wherein said touch surface and said plurality of spring means are integrated in a planar member, said planer member including slots defining said plurality of spring means from said touch surface.

UNITED STATES PATENT AND TRADEMARK OFFICE
CERTIFICATE OF CORRECTION

PATENT NO. : 5,854,625
DATED : December 29, 1998
INVENTOR(S) : Josef Frisch, Gregory Leyh, John C. Platt, Timothy P. Allen, Richard Schediwy, and Federico Faggin Page 9 of 9

It is certified that error appears in the above-indentified patent and that said Letters Patent is hereby corrected as shown below:

21. The force sensing touchpad of claim 1, wherein each of said variable capacitors is sensitive along a direction substantially perpendicular to said touch surface.--

Signed and Sealed this

Third Day of April, 2001

*Attest:*

NICHOLAS P. GODICI

*Attesting Officer*  Acting Director of the United States Patent and Trademark Office